United States Patent
Nakagawa et al.

(10) Patent No.: US 8,229,694 B2
(45) Date of Patent: Jul. 24, 2012

(54) COORDINATE MEASURING MACHINE

(75) Inventors: Hideyuki Nakagawa, Tsukuba (JP);
Nobuhiro Ishikawa, Best (NL)

(73) Assignee: Mitutoyo Corporation, Kawasaki-shi (JP)

(*) Notice: Subject to any disclaimer, the term of this patent is extended or adjusted under 35 U.S.C. 154(b) by 337 days.

(21) Appl. No.: 12/651,082

(22) Filed: Dec. 31, 2009

(65) Prior Publication Data

US 2010/0174504 A1 Jul. 8, 2010

(30) Foreign Application Priority Data

Jan. 6, 2009 (JP) ................................ 2009-000675

(51) Int. Cl.
*G01C 17/38* (2006.01)
(52) U.S. Cl. ........................................................ 702/95
(58) Field of Classification Search .................. 702/94, 702/95, 150; 33/503, 504, 556
See application file for complete search history.

(56) References Cited

U.S. PATENT DOCUMENTS 7,715,999 B2 * 5/2010 Kiyotani ........................ 702/95
2008/0065341 A1 * 3/2008 Ishikawa et al. ............... 702/95

FOREIGN PATENT DOCUMENTS

JP 2008-089578 4/2008

* cited by examiner

*Primary Examiner* — Bryan Bui
(74) *Attorney, Agent, or Firm* — Rankin, Hill & Clark LLP

(57) ABSTRACT

A coordinate measuring machine includes: a probe that has a contact point capable of movement within a predetermined range; a movement mechanism for moving the probe; and a controller for controlling the movement mechanism. The controller has a measurement value calculating unit for calculating a position of the contact point based on a displacement of the movement mechanism and a displacement of the probe. The measurement value calculating unit includes: a correction parameter calculator for calculating a correction parameter for correcting the displacement of the probe based on a measurement condition in measuring an object; a corrector for correcting the displacement of the probe based on the correction parameter; and a displacement synthesizing unit that synthesizes the displacement of the movement mechanism and the displacement of the probe corrected by the corrector to calculate the position of the contact point.

7 Claims, 9 Drawing Sheets

PUSH AMOUNT DURING PROFILING MEASUREMENT: SMALL

PUSH AMOUNT DURING PROFILING MEASUREMENT: LARGE

MEASUREMENT DIRECTION DURING PROFILING MEASUREMENT: COUNTERCLOCKWISE

MEASUREMENT DIRECTION DURING PROFILING MEASUREMENT: CLOCKWISE

FIG. 8A
RELATED ART

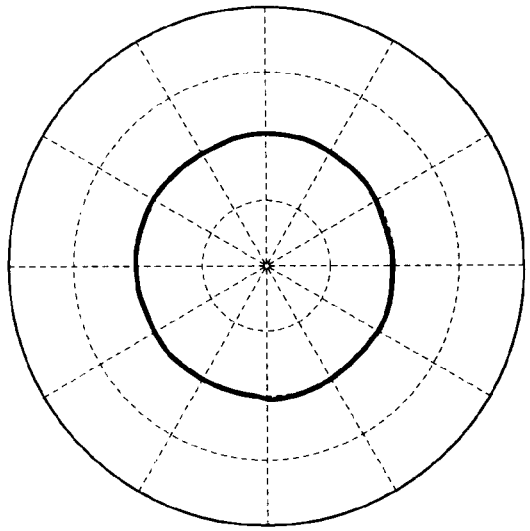

PUSH AMOUNT DURING PROFILING
MEASUREMENT: SMALL
PUSH AMOUNT DURING PROBE
CALIBRATION: SMALL

FIG. 8B
RELATED ART

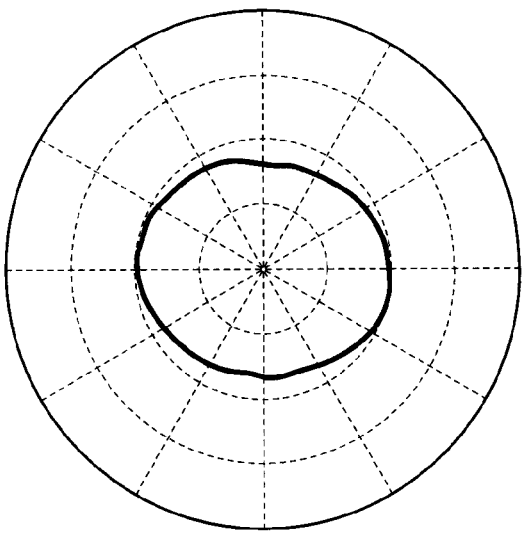

PUSH AMOUNT DURING PROFILING
MEASUREMENT: SMALL
PUSH AMOUNT DURING PROBE
CALIBRATION: LARGE

FIG. 8C
RELATED ART

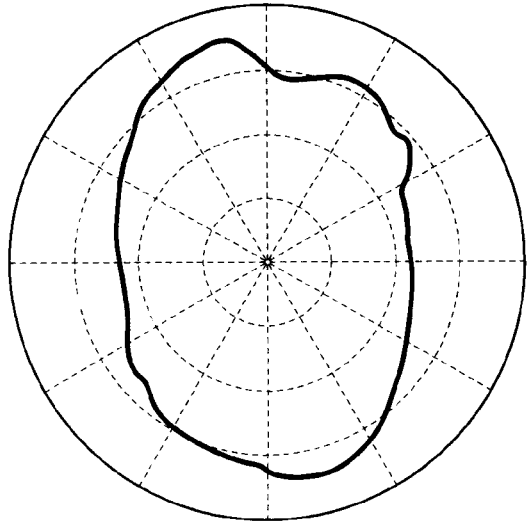

PUSH AMOUNT DURING PROFILING
MEASUREMENT: LARGE
PUSH AMOUNT DURING PROBE
CALIBRATION: SMALL

FIG. 8D
RELATED ART

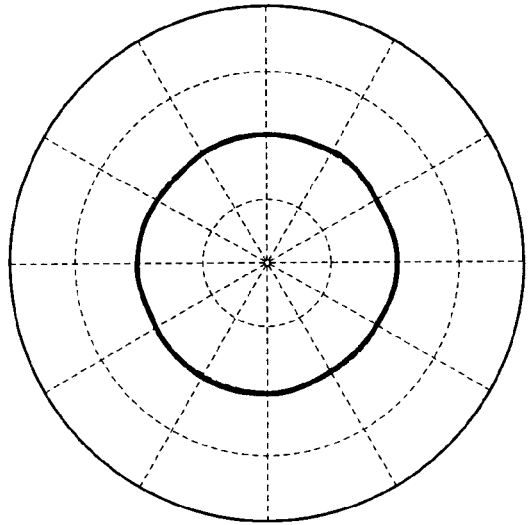

PUSH AMOUNT DURING PROFILING
MEASUREMENT: LARGE
PUSH AMOUNT DURING PROBE
CALIBRATION: LARGE

FIG. 9A
RELATED ART

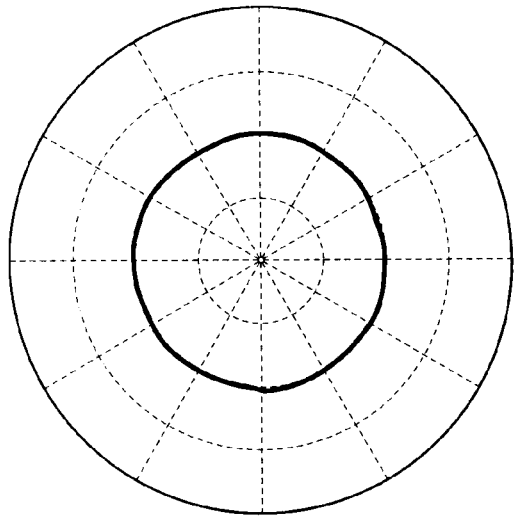

MEASUREMENT DIRECTION DURING PROFILING
MEASUREMENT: COUNTERCLOCKWISE
MEASUREMENT DIRECTION DURING PROBE
CALIBRATION: COUNTERCLOCKWISE

FIG. 9B
RELATED ART

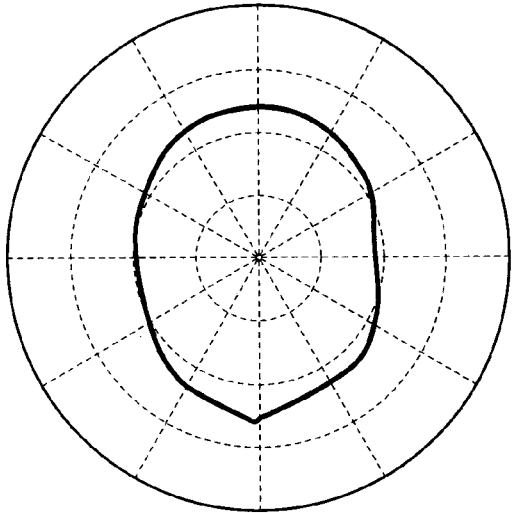

MEASUREMENT DIRECTION DURING PROFILING
MEASUREMENT: COUNTERCLOCKWISE
MEASUREMENT DIRECTION DURING PROBE
CALIBRATION: CLOCKWISE

FIG. 9C
RELATED ART

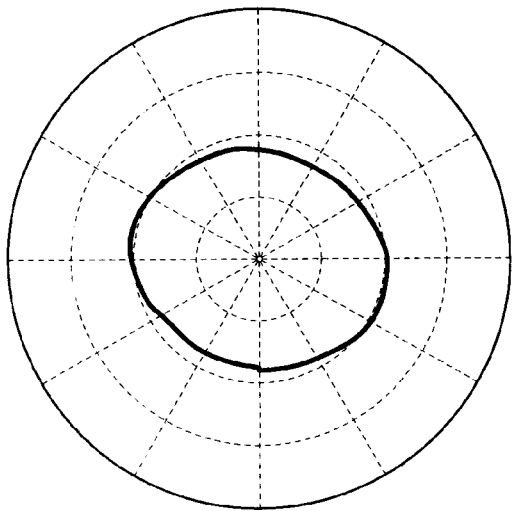

MEASUREMENT DIRECTION DURING PROFILING
MEASUREMENT: CLOCKWISE
MEASUREMENT DIRECTION DURING PROBE
CALIBRATION: COUNTERCLOCKWISE

FIG. 9D
RELATED ART

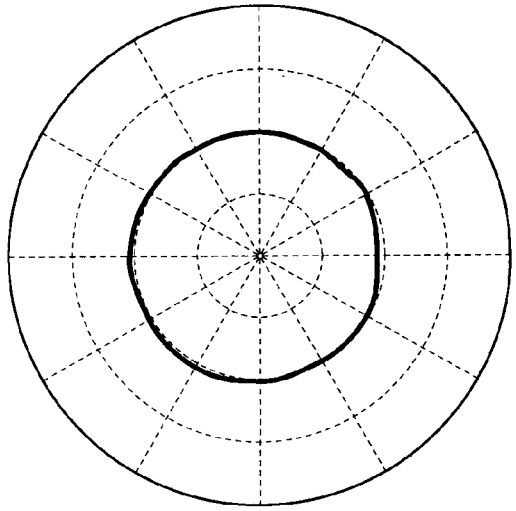

MEASUREMENT DIRECTION DURING PROFILING
MEASUREMENT: CLOCKWISE
MEASUREMENT DIRECTION DURING PROBE
CALIBRATION: CLOCKWISE

COORDINATE MEASURING MACHINE

The entire disclosure of Japanese Patent Application No. 2009-000675, filed Jan. 6, 2009, is expressly incorporated by reference herein.

BACKGROUND OF THE INVENTION

1. Field of the Invention

The present invention relates to a coordinate measuring machine.

2. Description of Related Art

Typically known coordinate measuring machine includes: a probe that is adapted to move within a predetermined range, the probe having a contact point to be in contact with an object to be measured; a movement mechanism that holds and moves the probe; and a controller that controls the movement mechanism. The coordinate measuring machine measures the object by moving the contact point along the surface of the object to be measured while forcing the probe against the object (see, for instance, Document 1: JP-A-2008-89578).

The surface profile measuring instrument (coordinate measuring machine) disclosed in the Document 1 moves the contact point along the surface of the object while the probe is forced against the object to acquire displacements of a drive mechanism (movement mechanism) and the probe and synthesize the displacements to detect the position (measurement value) of the contact point. Further, the surface profile measuring instrument measures a surface profile of the object and the like based on the detected measurement value.

Here, an error between the displacement of the probe acquired by the surface profile measuring instrument and actual displacement of the probe inevitably results in an error in the measurement value. Accordingly, in the typical arrangement, the displacement of the probe acquired by the surface profile measuring instrument is corrected by predetermined correction parameters as shown in the following formula (1) to reduce the measurement error.

$$\begin{pmatrix} X_{PA} \\ Y_{PA} \\ Z_{PA} \end{pmatrix} = \begin{pmatrix} CX_m & CX_{m-1} & \ldots & CX_1 & CX_0 \\ CY_m & CY_{m-1} & \ldots & CY_1 & CY_0 \\ CZ_m & CZ_{m-1} & \ldots & CZ_1 & CZ_0 \end{pmatrix} \begin{pmatrix} X_{PB}^n \\ Y_{PB}^n \\ \vdots \\ Z_{PB} \\ 1 \end{pmatrix} \quad (1)$$

Formula (1) shows the correction parameters $CX_m$ to $CX_0$, $CY_m$ to $CY_0$ and $CZ_m$ to $CZ_0$ defined by coefficients of polynomial equations of the displacements of the probe $X_{PB}$, $Y_{PB}$ and $Z_{PB}$ that approximate the corrected probe displacements $X_{PA}$, $Y_{PA}$ and $Z_{PA}$. Incidentally, the correction parameters $CX_m$ to $CX_0$, $CY_m$ to $CY_0$ and $CZ_m$ to $CZ_0$ can be obtained by measuring a reference sphere having a known diameter with predetermined measurement conditions (e.g. a push amount, measurement direction and measurement speed).

Here, the "push amount" refers to a displacement of the probe when the object is measured while the probe is forced against the object. The "measurement direction" refers to a rotation direction of each section of divided movement path of the probe that is approximated by an arc.

However, when the displacement of the probe is corrected by the predetermined correction parameters, the coordinate measuring machine may not properly correct the displacement of the probe under a measurement condition different from that when the correction parameters are obtained, thus resulting in increase in the measurement error. Specific explanation will be given below with reference to drawings.

FIGS. 8A to 8D show measurement results when only the measurement condition of the push amount is changed. FIGS. 9A to 9D show measurement results when only the measurement condition of the measurement direction is changed. Incidentally, FIGS. 8A to 8D and 9A to 9D show the measurement results obtained by measuring a side geometry of a cylindrical master gauge with different measurement conditions, where the correction parameters are defined by coefficients for approximating the corrected displacement of the probe with a third-degree polynomial equation of the displacement of the probe (i.e. when n=3 in the above-mentioned formula (1)).

Further, FIGS. 8A to 8D respectively show the measurement results where, while representing the push amount in relative two stages (i.e. small and large), (i) the push amount for measurement (during a profiling measurement) and (ii) the push amount in acquiring the correction parameter (during probe calibration) are: (i) small and (ii) small in FIG. 8A; (i) small and (ii) large in FIG. 8B; (i) large and (ii) small in FIG. 8C; and (i) large and (ii) large in FIG. 8D. FIGS. 9A to 9D show the measurement results where (i) the measurement direction during the profiling measurement and (ii) the measurement direction during the probe calibration are: (i) counterclockwise and (ii) counterclockwise in FIG. 9A; (i) counterclockwise and (ii) clockwise in FIG. 9B; (i) clockwise and (ii) counterclockwise in FIG. 9C; and (i) clockwise and (ii) clockwise in FIG. 9D.

When the measurement conditions during the probe calibration and the profiling measurement are the same, as shown in FIGS. 8A and 8D and FIGS. 9A and 9D, the coordinate measuring machine can appropriately correct the displacement of the probe and the measurement error can be reduced.

On the other hand, when the measurement conditions during the probe calibration and the profiling measurement are different, as shown in FIGS. 8B and 8C and FIGS. 9B and 9C, the coordinate measuring machine cannot appropriately correct the displacement of the probe and the measurement error is enlarged. Incidentally, though the push amount and the measurement direction are varied in FIGS. 8A to 8D and FIGS. 9A to 9D, the same applies when the measurement speed is varied.

SUMMARY OF THE INVENTION

An object of the invention is to provide a coordinate measuring machine that can properly correct a displacement of a probe irrespective of a change in a measurement condition and can reduce a measurement error.

A coordinate measuring machine according to an aspect of the invention includes: a probe that is adapted to move within a predetermined range, the probe having a contact point to be in contact with an object to be measured; a movement mechanism that holds and moves the probe; and a controller that controls the movement mechanism, the coordinate measuring machine measuring the object by moving the contact point along a surface of the object to be measured while forcing the probe against the object, the controller including: a displacement acquiring unit that acquires a displacement of the movement mechanism and a displacement of the probe; a correction parameter calculator that calculates a correction parameter for correcting the displacement of the probe acquired by the displacement acquiring unit; a corrector that corrects the displacement of the probe acquired by the displacement acquiring unit based on the correction parameter; and a displacement synthesizing unit that synthesizes the displacement of the movement mechanism and the displacement of the probe corrected by the corrector to calculate the position of the contact point, in which the correction parameter calculator calculates the correction parameter based on a measurement condition in measuring the object.

According to the above aspect of the invention, the coordinate measuring machine includes the correction parameter calculator for calculating the correction parameter for correcting the displacement of the probe based on the measurement condition in measuring the object. Accordingly, the corrector can properly correct the displacement of the probe with the correction parameter in accordance with the measurement condition. Thus, the coordinate measuring machine can properly correct the displacement of the probe irrespective of the change in the measurement condition and can reduce the measurement error.

In the above aspect of the invention, the correction parameter calculator preferably calculates the correction parameter based on a push amount of the probe and a measurement direction.

With the above arrangement, the corrector corrects the displacement of the probe according to the correction parameter depending on the push amount of the probe and the measurement direction. Thus, the coordinate measuring machine can properly correct the displacement of the probe irrespective of the change in the measurement condition and can reduce the measurement error.

In the above aspect of the invention, the correction parameter calculator preferably detects the measurement direction based on a position command value for moving the probe by the movement mechanism.

With the above arrangement, since the correction parameter calculating unit can automatically detect the measurement direction, the measurement direction can be easily detected even when, for instance, the probe is freely moved by the movement mechanism. Thus, the coordinate measuring machine can properly correct the displacement of the probe irrespective of the change in the measurement condition and can reduce the measurement error.

In the above aspect of the invention, the correction parameter calculated by the correction parameter calculator preferably includes three correction parameters for correcting the displacement of the probe in three planes of an orthogonal coordinate system, and the corrector preferably corrects the displacement of the probe in the three planes respectively by the three correction parameters and, subsequently, preferably synthesizes respective axial components of the corrected displacements to correct the displacement of the probe.

With the above arrangement, since the correction parameter calculator calculates the correction parameters for correcting the displacements of the probe in the respective planes, the effect of the correction by the correction parameters can be more easily recognized in the respective planes than calculating the correction parameter for correcting the displacement of the probe in a three-dimensional space.

Further, since the corrector corrects the displacement of the probe by synthesizing the corrected displacements of the probe for each axial component thereof, the error in the correction parameters can be reduced by an averaging effect. Thus, the coordinate measuring machine can properly correct the displacement of the probe irrespective of the change in the measurement condition and can reduce the measurement error.

In the above aspect of the invention, the correction parameters are preferably coefficients of a polynomial equation of the displacement of the probe that approximates the corrected displacement of the probe.

With the above arrangement, since the order of the polynomial equation can be changed in each of the planes depending on the influence of the correction, the time required for the correction processing can be reduced.

In the above aspect of the invention, the correction parameters are preferably coefficients of a formula of a circle of the displacement of the probe that approximates the corrected displacement of the probe.

With the above arrangement, since the number of the correction parameters can be reduced as compared with the arrangement in which the correction parameters are defined as coefficients of a polynomial equation, the time required for the correction processing can be reduced.

In the above aspect of the invention, one or two of the correction parameters are preferably coefficients of a polynomial equation of the displacement of the probe that approximates the corrected displacement of the probe and the rest of the correction parameters are preferably coefficients of a formula of a circle of the displacement of the probe that approximates the corrected displacement of the probe.

The correction parameter can be obtained by, for instance, measuring a reference sphere with a known diameter while varying the measurement condition. When the locus drawn by the contact point in measuring the reference sphere is found to be sufficiently approximated by a formula of a circle, the displacement of the probe can be properly corrected with less number of correction parameters by defining the correction parameter as the coefficients of the formula of the circle of the displacement of the probe that approximates the corrected displacement of the probe. However, when the correction parameter is defined by the coefficients of a formula of a circle of the displacement of the probe that approximates the corrected displacement of the probe, the displacement of the probe may not be properly corrected in a circumstance other than the above.

According to the above arrangement, since the polynomial equation of different orders and the formula of the circle can be selectably used for the respective planes depending on the influence of the correction and the locus drawn by the contact point when the reference sphere is measured, the time required for the correction processing can be reduced while properly correcting the displacement of the probe.

BRIEF DESCRIPTION OF THE DRAWINGS

FIG. 8A is an illustration showing a measuring result when both of the push amount during the profiling measurement and the push amount during a probe calibration are small.

FIG. 8B is an illustration showing a measuring result when the push amount during the profiling measurement is small and the push amount during the probe calibration is large.

FIG. 8C is an illustration showing a measuring result when the push amount during the profiling measurement is large and the push amount during the probe calibration is small.

FIG. 8D is an illustration showing a measuring result when both of the push amount during the profiling measurement and the push amount during the probe calibration are large.

FIG. 9A is an illustration showing a measurement result when both of the measurement direction during the profiling measurement and the measurement direction during the probe calibration are counterclockwise.

FIG. 9B is an illustration showing a measurement result when the measurement direction during the profiling measurement is counterclockwise and the measurement direction during the probe calibration is clockwise.

FIG. 9C is an illustration showing a measurement result when the measurement direction during the profiling measurement is clockwise and the measurement direction during the probe calibration is counterclockwise.

FIG. 9D is an illustration showing a measurement result when both of the measurement direction during the profiling measurement and the measurement direction during the probe calibration are clockwise.

DETAILED DESCRIPTION OF PREFERRED EMBODIMENT(S)

Figure 1:
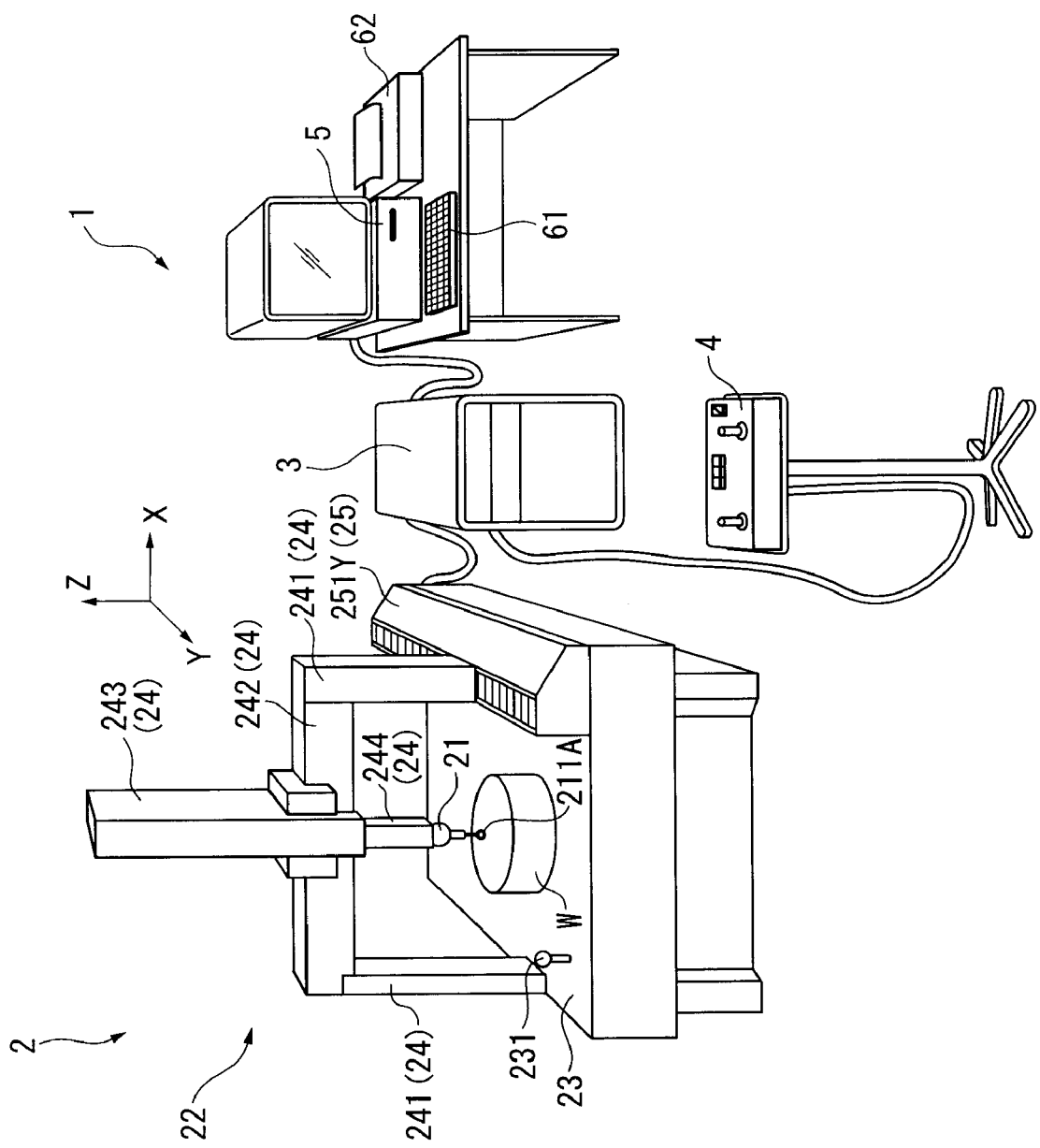
FIG. 1 is a view showing an entirety of a coordinate measuring machine according to an exemplary embodiment of the invention.
Figure 2:
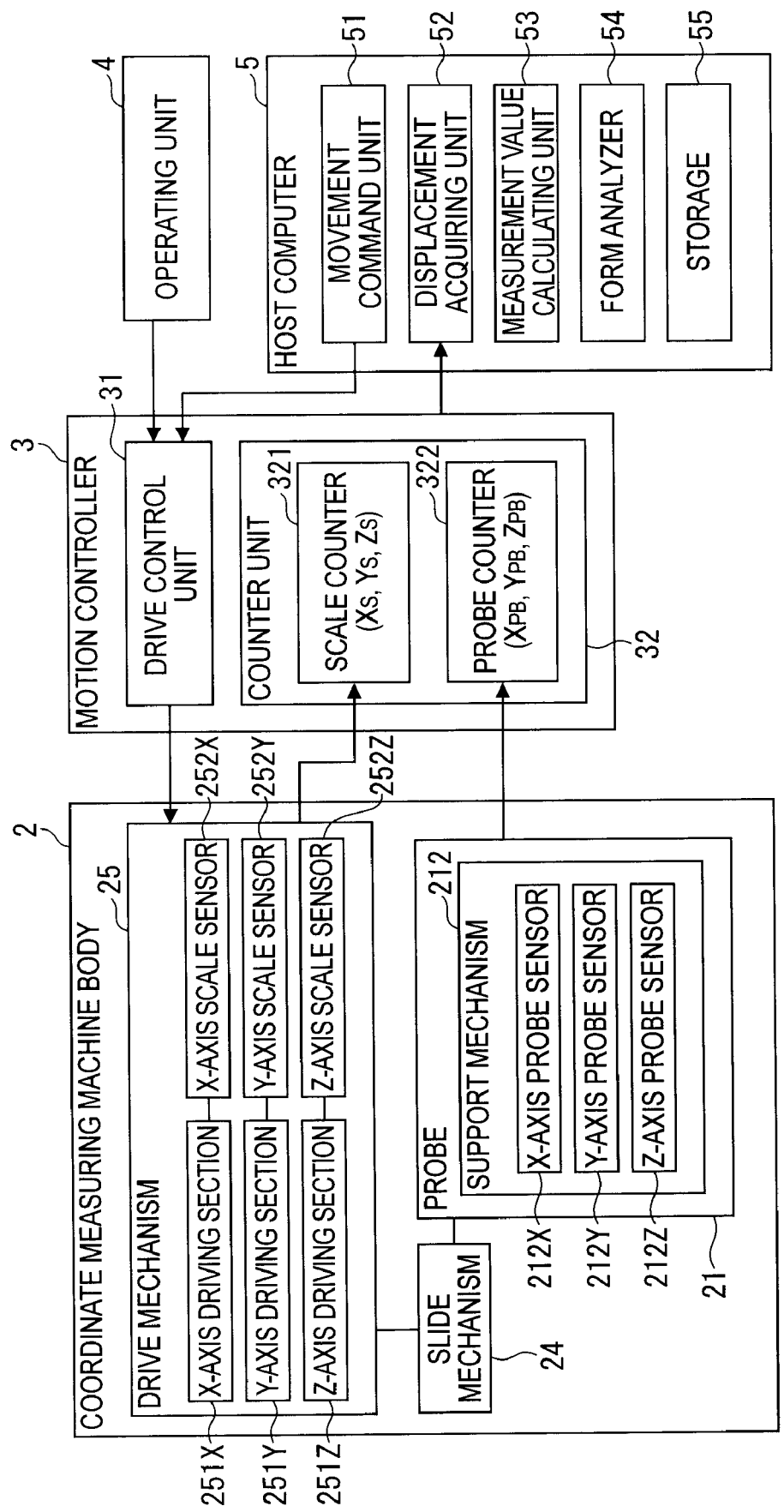
FIG. 2 is a block diagram showing an outline of the coordinate measuring machine according to the exemplary embodiment.

An exemplary embodiment of the invention will be described below with reference to the attached drawings.
Outline of Coordinate Measuring Machine FIG. 1 is a view showing an entirety of a coordinate measuring machine 1 according to the exemplary embodiment of the invention. FIG. 2 is a block diagram showing an outline of the coordinate measuring machine 1. An upper direction in FIG. 1 is denoted as +Z-axis direction and two axes perpendicular to the Z-axis are respectively denoted as an X-axis and Y-axis, which also applies in the rest of the drawings.

As shown in FIG. 1, the coordinate measuring machine 1 includes: a coordinate measuring machine body 2; a motion controller 3 that controls the drive of the coordinate measuring machine body 2; an operating unit 4 that issues a command to the motion controller 3 via an operation lever and the like to manually operate the coordinate measuring machine body 2; a host computer 5 that issues a predetermined command to the motion controller 3 and performs an arithmetic calculation for shape analysis of an object W placed on the coordinate measuring machine body 2; and an input unit 61 and output unit 62 connected to the host computer 5. Incidentally, the input unit 61 inputs a measurement condition and the like of the coordinate measuring machine 1 into the host computer 5. The output unit 62 outputs the measurement results of the coordinate measuring machine 1.

The coordinate measuring machine body 2 includes: a probe 21 provided with a contact point 211A for measuring the object W at a tip end (−Z-axis direction side) of the probe 21; a movement mechanism 22 that holds a base end (+Z-axis direction side) thereof and moves the probe 21; and a measurement stage 23 on which the movement mechanism 22 is disposed upright. A reference sphere 231 having known diameter for calibrating the coordinate measuring machine body 2 is disposed on the measurement stage 23. The reference sphere 231 can be placed at a plurality of locations on the measurement stage 23.

The movement mechanism 22 includes: a slide mechanism 24 that holds the base end of the probe 21 while allowing a slide movement of the probe 21; and a drive mechanism 25 for moving the probe 21 by driving the slide mechanism 24.

The slide mechanism 24 includes: two beam supports 241 extending in +Z-axis direction on both X-axis-direction sides of the measurement stage 23 in a manner capable of slide movement along the Y-axis direction; a beam 242 extending in the X-axis direction and being supported by the beam supports 241; a column 243 with a cylindrical configuration extending along the Z-axis direction, the column 243 being capable of slide movement along the beam 242 in the X-axis direction; and a spindle 244 inserted in the column 243 in a manner capable of slide movement within the column 243 along the Z-axis direction. Accordingly, the movement mechanism 22 has a plurality of movement axes for moving the probe 21 in the directions of X, Y and Z-axes, respectively. The spindle 244 holds the base end of the probe 21 at an end thereof in the −Z-axis direction. A plurality of probes are prepared for the probe 21, among which suitable one is selected to be held by the spindle 244.

As shown in FIGS. 1 and 2, the drive mechanism 25 includes: a Y-axis driving section 251Y that supports one of the beam supports 241 (one on the +X-axis direction side) and slides the beam support 241 in the Y-axis direction; an X-axis driving section 251X (not shown in FIG. 1) that slides the column 243 on the beam 242 to displace the column 243 in the X-axis direction; and a Z-axis driving section 251Z (not shown in FIG. 1) that slides the spindle 244 within the column 243 to move the spindle 244 in the Z-axis direction.

As shown in FIG. 2, the X-axis driving section 251X, Y-axis driving section 251Y and Z-axis driving section 251Z are respectively provided with an X-axis scale sensor 252X, Y-axis scale sensor 252Y and Z-axis scale sensor 252Z for sensing the axial position of the column 243, the beam supports 241 and the spindle 244, respectively. Incidentally, the scale sensors 252X, 252Y and 252Z are position sensors that output a pulse signal in accordance with the displacements of the column 243, the beam supports 241 and the spindle 244.

Figure 3:
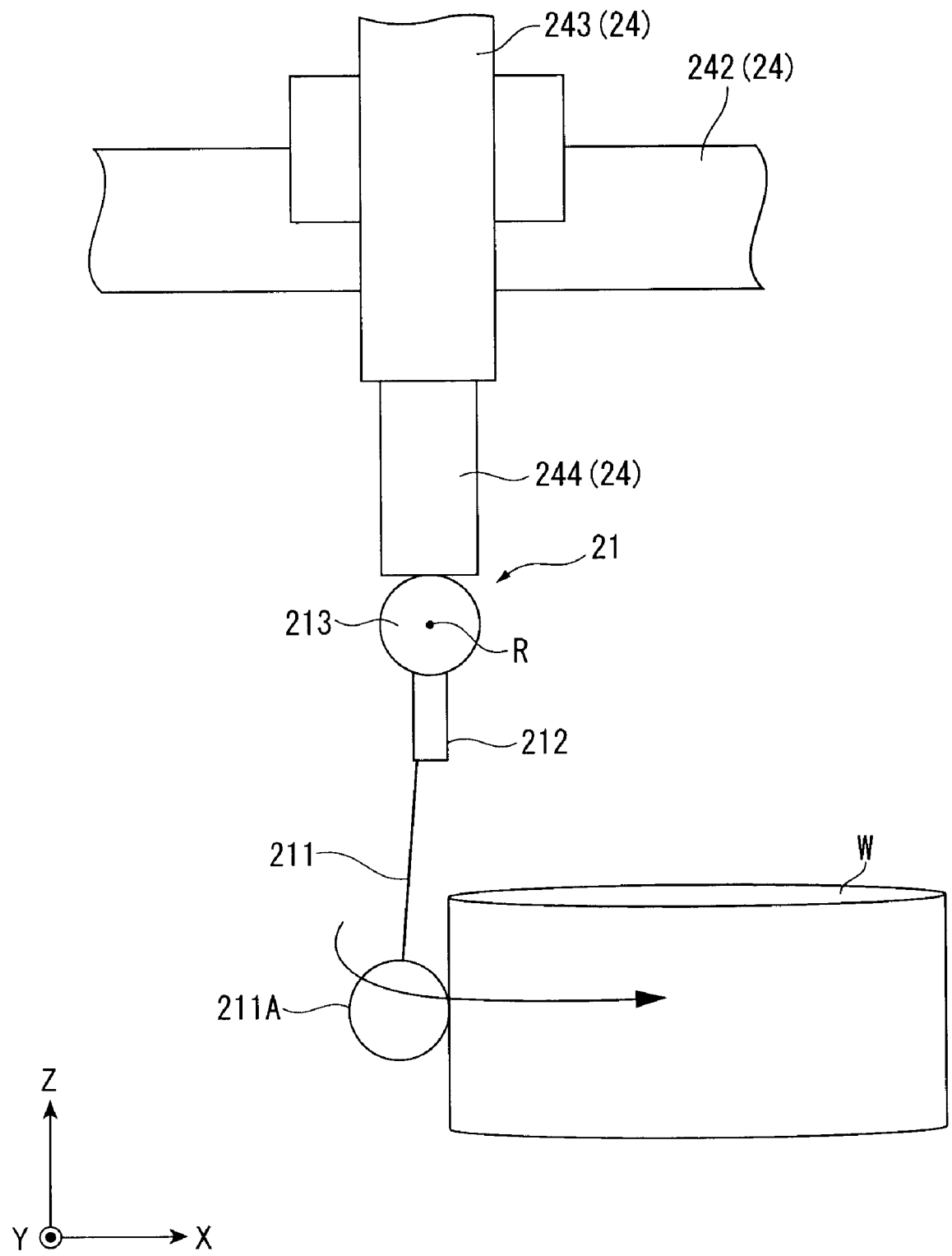
FIG. 3 is an enlarged schematic illustration showing a part of a spindle holding a probe according to the exemplary embodiment.

FIG. 3 is an enlarged schematic illustration showing a part of the spindle 244 at which the probe 21 is held.

As shown in FIG. 3, the probe 21 includes: a stylus 211 that has the contact point 211A at a tip end thereof; a support mechanism 212 that supports a base end of the stylus 211; and a rotation mechanism 213 that allows a rotation of the support mechanism 212 relative to the spindle 244.

The support mechanism 212 supports the stylus 211 so that the stylus 211 is biased in the X, Y and Z-axis directions to be positioned at a predetermined location and, when an external force is applied (i.e. when being in contact with the object W), the stylus 211 is capable of displacement in the X, Y and Z-axis directions within a predetermined range. As shown in FIG. 2, the support mechanism 212 includes an X-axis probe sensor 212X, a Y-axis probe sensor 212Y and a Z-axis probe sensor 212Z for sensing the position of the stylus 211 in the X, Y and Z-axis directions, respectively. The probe sensors 212X, 212Y and 212Z are position sensors that output a pulse signal according to the displacement of the stylus 211 in the X, Y and Z-axis directions in the same manner as the scale sensors 252X, 252Y and 252Z.

The rotation mechanism 213 is a mechanism for changing an orientation of the probe 21 (orientation of the probe 21 from the base end to the tip end, i.e. attitude of the probe 21) by rotating the support mechanism 212 and the stylus 211. Incidentally, the rotation mechanism 213 allows the rotation of the support mechanism 212 and the stylus 211 about the X, Y and Z-axes around a reference point R.

As shown in FIG. 2, the motion controller 3 includes: a drive control unit 31 that controls the drive mechanism 25 in response to a command from the operating unit 4 or the host computer 5; and a counter unit 32 for counting the pulse signals outputted by the scale sensors 252X, 252Y and 252Z and the probe sensors 212X, 212Y and 212Z.

The counter unit 32 includes: a scale counter 321 for counting the pulse signals outputted by the scale sensors 252X, 252Y and 252Z to measure the displacement $(X_S, Y_S, Z_S)$ of the slide mechanism 24; and a probe counter 322 for counting the pulse signals outputted by the probe sensors 212X, 212Y and 212Z to measure the displacement $(X_{PB}, Y_{PB}, Z_{PB})$ of the probe 21. The displacement of the slide mechanism 24 (referred to as a scale value S hereinafter) measured by the scale counter 321 and the displacement of the probe 21 (referred to as a probe value PB hereinafter) measured by the probe counter 322 are outputted to the host computer 5.

The host computer 5 (controller) is provided with a CPU (Central Processing Unit), memory and the like, which issues a predetermined command to the motion controller 3 to control the operation of the coordinate measuring machine body 2. The host computer 5 includes: a movement command unit 51, a displacement acquiring unit 52, a measurement value calculating unit 53, a form analYzer 54 and a storage 55.

The movement command unit 51 issues a predetermined command to the drive control unit 31 of the motion controller 3 so that the slide mechanism 24 of the coordinate measuring machine body 2 conducts a scanning movement. Specifically, the movement command unit 51 outputs a position command value for moving the contact point 211A along the surface of the object W while the probe 21 is forced against the object W. Incidentally, in this exemplary embodiment, the movement command unit 51 sequentially outputs a position command value for circularly moving the contact point 211A at a constant angular velocity so that the contact point 211A draws a circular locus along a side of the object W according to the profile data of the cylindrical object W.

The displacement acquiring unit 52 acquires the scale value S and the probe value PB measured by the scale counter 321 and the probe counter 322 at a predetermined sampling interval. In other words, the displacement acquiring unit 52 acquires the displacement of the movement mechanism 22 and the displacement of the probe 21.

The measurement value calculating unit 53 calculates a measurement value, i.e. the position of the contact point 211A, based on the scale value S and the probe value PB acquired by the displacement acquiring unit 52. Incidentally, the scale value S is adjusted to indicate the position of the contact point 211A when the probe 21 is oriented in the −Z-axis direction and no displacement of the stylus 211 is occurred in the support mechanism 212.

The form analYzer 54 synthesizes the measurement value calculated by the measurement value calculating unit 53 to calculate the surface profile data of the object W and analYzes the form of the object W by comparing the calculated surface profile data of the object W with the profile data to calculate are error, distortion and the like.

The storage 55 stores the data used in the host computer 5, which, for example, stores a measurement condition inputted via the input unit 61, a measurement result outputted by the output unit 62 and the like. The measurement condition inputted via the input unit 61 includes the profile data of the object W used by the movement command unit 51 and the form analYzer 54, and the sampling interval for acquiring the scale value S and the probe value PB by the displacement acquiring unit 52 as well as the push amount, measurement direction and measurement speed.

Detailed Arrangement of Measurement Value Calculating Unit

Figure 4:
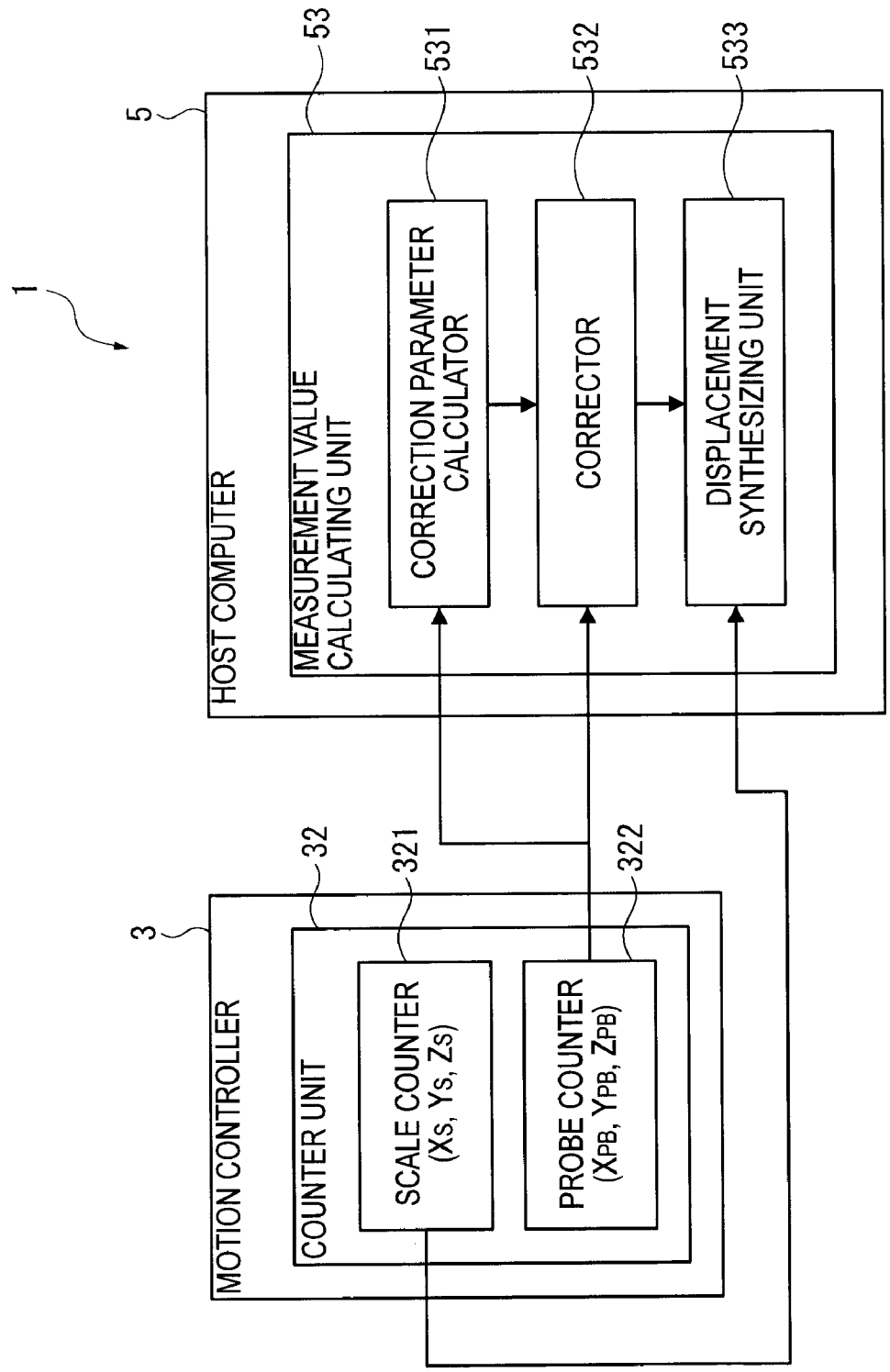
FIG. 4 is a block diagram showing a detailed structure of a measurement value calculating unit according to the exemplary embodiment.

FIG. 4 is a block diagram showing a detailed structure of the measurement value calculating unit 53.

As shown in FIG. 4, the measurement value calculating unit 53 includes: a correction parameter calculator 531 for calculating correction parameters for correcting the probe value PB acquired by the displacement acquiring unit 52; a corrector 532 for correcting the probe value PB acquired by the displacement acquiring unit 52 based on the correction parameters calculated by the correction parameter calculator 531; and a displacement synthesizing unit 533 fcr calculating the measurement value by synthesizing the scale value S acquired by the displacement acquiring unit 52 and the probe value PB corrected by the corrector 532.

The correction parameter calculator 531 calculates three correction parameters for correcting the probe value PB in three planes (i.e. XY plane, XZ plane and YZ plane) of an orthogonal coordinate system based on the measurement conditions for measuring the object W. In this exemplary embodiment, the correction parameter calculator 531 calculates the correction parameters based on the push amount and the measurement direction.

Specifically, the correction parameter calculator 531 calculates the correction parameters for correcting the probe value PB in the XY plane according to the following formulae (2-1) to (2-3):

$$\begin{pmatrix} CX_{m\_XY} \\ \vdots \\ CX_{0\_XY} \\ CY_{m\_XY} \\ \vdots \\ CY_{0\_XY} \end{pmatrix} = \begin{pmatrix} MX_{m\_n\_XY} & MX_{m\_n-1\_XY} & \cdots & MX_{m\_0\_XY} \\ \vdots & \vdots & & \vdots \\ MX_{0\_n\_XY} & MX_{0\_n-1\_XY} & \cdots & MX_{0\_0\_XY} \\ MY_{m\_n\_XY} & MY_{m\_n-1\_XY} & \cdots & MY_{m\_0\_XY} \\ \vdots & \vdots & & \vdots \\ MY_{0\_n\_XY} & MY_{0\_n-1\_XY} & \cdots & MY_{0\_0\_XY} \end{pmatrix} \begin{pmatrix} D_P^n \\ D_P^{n-1} \\ \vdots \\ 1 \end{pmatrix} \quad (2\text{-}1)$$

$$\begin{cases} MX_{m\_n\_XY} = MXP_{m\_n\_XY} \\ \vdots \\ MX_{0\_0\_XY} = MXP_{0\_0\_XY} \\ MY_{m\_n\_XY} = MYP_{m\_n\_XY} \\ \vdots \\ MY_{0\_0\_XY} = MYP_{0\_0\_XY} \end{cases} \quad (2\text{-}2)$$

$$\begin{cases} MX_{m\_n\_XY} = MXM_{m\_n\_XY} \\ \vdots \\ MX_{0\_0\_XY} = MXM_{0\_0\_XY} \\ MY_{m\_n\_XY} = MYM_{m\_n\_XY} \\ \vdots \\ MY_{0\_0\_XY} = MYM_{0\_0\_XY} \end{cases} \quad (2\text{-}3)$$

The formula (2-1) is for calculating the correction parameters $CX_{m\_XY}$ to $CY_{0\_XY}$ (collectively referred to as correction parameter $C_{XY}$ hereinafter) for correcting the probe value PB in the XY plane. The correction parameter $C_{XY}$ is calculated according to polynomial equations of the push amount $D_P$. Coefficients vectors $MX_{m\_n\_XY}$ to $MY_{0\_0\_XY}$ (collectively referred to as correction vector $M_{XY}$ hereinafter) of the polynomial equations of the push amount $D_P$ differ according to the measurement direction, i.e. clockwise direction or counterclockwise direction. The coefficient vector is calculated according to the formula (2-2) when the measurement direction is clockwise, and the coefficient vector is calculated according to the formula (2-3) when the measurement direction is counterclockwise. The details of the calculation of the coefficient vector $M_{XY}$ will be described later.

The push amount $D_P$ refers to the displacement of the probe 21 when the object W is measured while the probe 21 is forced against the object W, which is calculated according to the following formula (3).

$$D_P = \sqrt{X_{PB}^2 + Y_{PB}^2 + Z_{PB}^2} \quad (3)$$

The measurement direction refers to a rotation direction of an arc approximating each section of divided movement paths of the probe 21, which is detected according to the position command value outputted by the movement command unit 51. Specifically, the correction parameter calculator 531 detects the measurement direction by calculating angles θ1 and θ2 according to the following formulae (4) and (5), where $X_R$ and $Y_R$ are the current position command values within the XY plane: $X1_R$ and $Y1_R$ are the position command values before one sampling interval: and $X2_R$ and $Y2_R$ are the position command values before two sampling intervals.

$$\theta 1 = \tan^{-1} \frac{Y_R - Y1_R}{X_R - X1_R} \quad (4)$$

$$\theta 2 = \tan^{-1} \frac{Y1_R - Y2_R}{X1_R - X2_R} \quad (5)$$

Figure 5A:
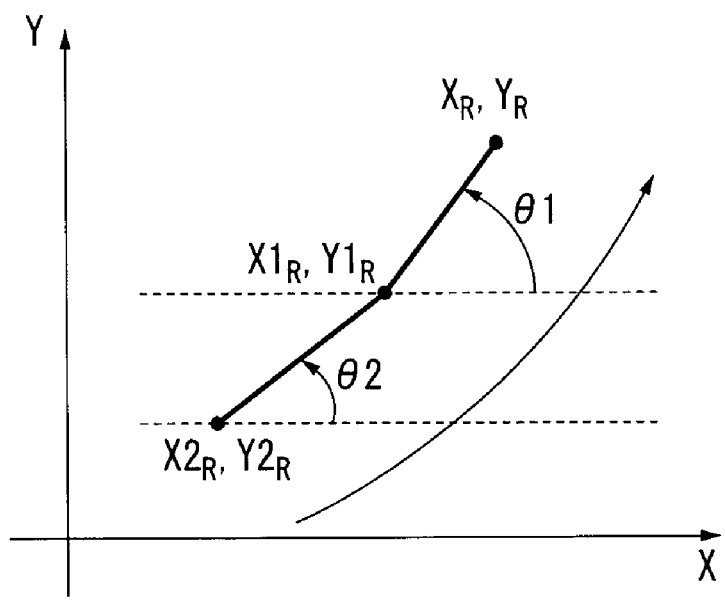
FIG. 5A is a graph showing a relationship between two angles calculated by a correction parameter calculator when a measurement direction is counterclockwise in the exemplary embodiment.
Figure 5B:
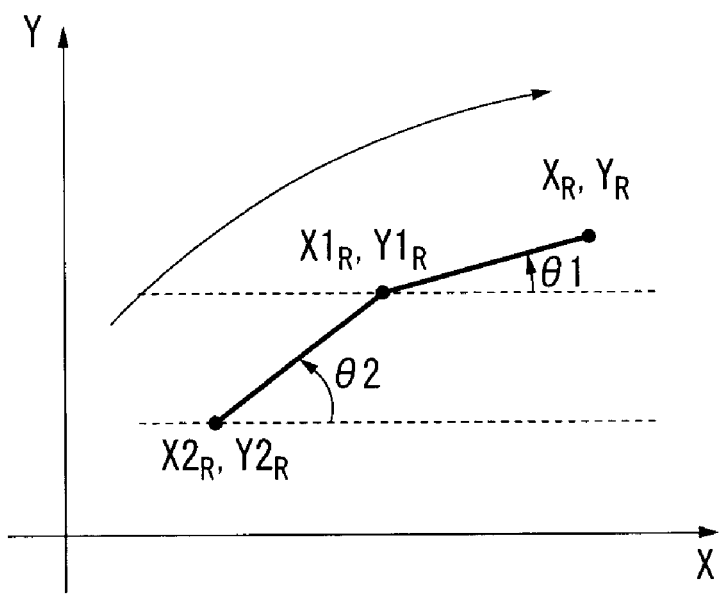
FIG. 5B is a graph showing a relationship between the two angles calculated by the correction parameter calculator when the measurement direction is clockwise in the exemplary embodiment.

FIGS. 5A and 5B are graphs showing a relationship between the two angles θ1 and θ2 calculated by the correction parameter calculator 531 when the measurement direction is counterclockwise and clockwise, respectively. FIG. 5A shows the relationship when the measurement direction is counterclockwise within the XY plane. FIG. 5B shows the relationship when the measurement direction is clockwise within the XY plane The correction parameter calculator 531 compares the calculated θ1 and θ2. When θ1>θ2, the correction parameter calculator 531 detects that the measurement direction is counterclockwise (see FIG. 5A). When θ1<θ2, the correction parameter calculator 531 detects that the measurement direction is clockwise (see FIG. 5B).

Further, the correction parameter calculator 531 calculates the correction parameters for correcting the probe value PB within the XZ plane according to the following formulae (6-1) to (6-3) and also calculates the correction parameters for correcting the probe value PB within the YZ plane according to the following formulae (7-1) to (7-3). Incidentally, the calculation of the push amount $D_P$ and the detection of the measurement direction are conducted by the correction parameter calculator 531 according to the formulae (3) to (5) in the same manner as the calculation of the correction parameter $C_{XY}$.

$$\begin{pmatrix} CX_{m\_XZ} \\ \vdots \\ CX_{0\_XZ} \\ CZ_{m\_XZ} \\ \vdots \\ CZ_{0\_XZ} \end{pmatrix} = \begin{pmatrix} MX_{m\_n\_XZ} & MX_{m\_n-1\_XZ} & \cdots & MX_{m\_0\_XZ} \\ \vdots & \vdots & & \vdots \\ MX_{0\_n\_XZ} & MX_{0\_n-1\_XZ} & \cdots & MX_{0\_0\_XZ} \\ MZ_{m\_n\_XZ} & MZ_{m\_n-1\_XZ} & \cdots & MZ_{m\_0\_XZ} \\ \vdots & \vdots & & \vdots \\ MZ_{0\_n\_XZ} & MZ_{0\_n-1\_XZ} & \cdots & MZ_{0\_0\_XZ} \end{pmatrix} \begin{pmatrix} D_P^n \\ D_P^{n-1} \\ \vdots \\ 1 \end{pmatrix} \quad (6\text{-}1)$$

$$\begin{cases} MX_{m\_n\_XZ} = MXP_{m\_n\_XZ} \\ \vdots \\ MX_{0\_0\_XZ} = MXP_{0\_0\_XZ} \\ MZ_{m\_n\_XZ} = MZP_{m\_n\_XZ} \\ \vdots \\ MZ_{0\_0\_XZ} = MZP_{0\_0\_XZ} \end{cases} \quad (6\text{-}2)$$

$$\begin{cases} MX_{m\_n\_XZ} = MXM_{m\_n\_XZ} \\ \vdots \\ MX_{0\_0\_XZ} = MXM_{0\_0\_XZ} \\ MZ_{m\_n\_XZ} = MZM_{m\_n\_XZ} \\ \vdots \\ MZ_{0\_0\_XZ} = MZM_{0\_0\_XZ} \end{cases} \quad (6\text{-}3)$$

$$\begin{pmatrix} CY_{m\_YZ} \\ \vdots \\ CY_{0\_YZ} \\ CZ_{m\_YZ} \\ \vdots \\ CZ_{0\_YZ} \end{pmatrix} = \begin{pmatrix} MY_{m\_n\_YZ} & MY_{m\_n-1\_YZ} & \cdots & MY_{m\_0\_YZ} \\ \vdots & \vdots & & \vdots \\ MY_{0\_n\_YZ} & MY_{0\_n-1\_YZ} & \cdots & MY_{0\_0\_YZ} \\ MZ_{m\_n\_YZ} & MZ_{m\_n-1\_YZ} & \cdots & MZ_{m\_0\_YZ} \\ \vdots & \vdots & & \vdots \\ MZ_{0\_n\_YZ} & MZ_{0\_n-1\_YZ} & \cdots & MZ_{0\_0\_YZ} \end{pmatrix} \begin{pmatrix} D_P^n \\ D_P^{n-1} \\ \vdots \\ 1 \end{pmatrix} \quad (7\text{-}1)$$

$$\begin{cases} MY_{m\_n\_YZ} = MYP_{m\_n\_YZ} \\ \vdots \\ MY_{0\_0\_YZ} = MYP_{0\_0\_YZ} \\ MZ_{m\_n\_YZ} = MZP_{m\_n\_YZ} \\ \vdots \\ MZ_{0\_0\_YZ} = MZP_{0\_0\_YZ} \end{cases} \quad (7\text{-}2)$$

$$\begin{cases} MY_{m\_n\_YZ} = MYM_{m\_n\_YZ} \\ \vdots \\ MY_{0\_0\_YZ} = MYM_{0\_0\_YZ} \\ MZ_{m\_n\_YZ} = MZM_{m\_n\_YZ} \\ \vdots \\ MZ_{0\_0\_YZ} = MZM_{0\_0\_YZ} \end{cases} \quad (7\text{-}3)$$

The formula (6-1) is for calculating the correction parameters $CX_{m\_XZ}$ to $CZ_{0\_XZ}$ (collectively referred to as correction parameter $C_{XZ}$) for correcting the probe value PB in the XZ plane. The correction parameter $C_{XZ}$ is calculated according to polynomial equations of the push amount $D_P$. Coefficients vectors $MX_{m\_n\_XZ}$ to $MY_{0\_0\_XZ}$ (collectively referred to as correction vector $M_{XZ}$ hereinafter) of the polynomial equations of the push amount $D_P$ differ according to the measurement direction (i.e. clockwise or counterclockwise). The coefficient vector is calculated according to the formula (6-2) when the measurement direction is clockwise, and the coefficient vector is calculated according to the formula (6-3) when the measurement direction is counterclockwise. The details of the calculation of the coefficient vector $M_{XZ}$ will be described later.

The formula (7-1) is for calculating the correction parameters $CY_{m\_YZ}$ to $CZ_{0\_YZ}$ (collectively referred to as correction parameter $C_{YZ}$) for correcting the probe value PB in the YZ plane. The correction parameter $C_{YZ}$ is calculated according to polynomial equations of the push amount $D_P$. Coefficients vectors $MY_{m\_n\_YZ}$ to $MZ_{0\_0\_YZ}$ (collectively referred to as correction vector $M_{YZ}$ hereinafter) of the polynomial equations of the push amount $D_P$ differ according to the measurement direction (i.e. clockwise or counterclockwise). The coefficient vector is calculated according to the formula (7-2) when the measurement direction is clockwise, and the coefficient vector is calculated according to the formula (7-3) when the measurement direction is counterclockwise. The details of the calculation of the coefficient vector $M_{YZ}$ will be described later.

The corrector 532 corrects the probe value PB within the respective planes according to the correction parameters $C_{XY}$, $C_{XZ}$ and $C_{YZ}$ calculated by the correction parameter calculator 531. Specifically, the corrector 532 calculates corrected probe values ($X_{PA\_XY}$, $Y_{PA\_XY}$, $X_{PA\_XZ}$, $Z_{PA\_XZ}$, $Y_{PA\_YZ}$, $Z_{PA\_YZ}$) within the respective planes by polynomial equations of the probe value PB as shown in the following formulae (8-1) to (8-3). In other words, the correction parameters $C_{XY}$, $C_{XZ}$ and $C_{YZ}$ are coefficients for approximating the corrected probe values $X_{PA\_XY}$ to $Z_{PA\_YZ}$ by the polynomial equations of the probe value PB.

$$\begin{pmatrix} X_{PA\_XY} \\ Y_{PA\_XY} \end{pmatrix} = \begin{pmatrix} CX_{m\_XY} & CX_{m-1\_XY} & \ldots & CX_{1\_XY} & CX_{0\_XY} \\ CY_{m\_XY} & CY_{m-1\_XY} & \ldots & CY_{1\_XY} & CY_{0\_XY} \end{pmatrix} \begin{pmatrix} X_{PB}^n \\ Y_{PB}^n \\ \vdots \\ Y_{PB} \\ 1 \end{pmatrix} \quad (8\text{-}1)$$

$$\begin{pmatrix} X_{PA\_XZ} \\ Z_{PA\_XZ} \end{pmatrix} = \begin{pmatrix} CX_{m\_XZ} & CX_{m-1\_XZ} & \ldots & CX_{1\_XZ} & CX_{0\_XZ} \\ CZ_{m\_XZ} & CZ_{m-1\_XZ} & \ldots & CZ_{1\_XZ} & CZ_{0\_XZ} \end{pmatrix} \begin{pmatrix} X_{PB}^n \\ Z_{PB}^n \\ \vdots \\ Z_{PB} \\ 1 \end{pmatrix} \quad (8\text{-}2)$$

$$\begin{pmatrix} Y_{PA\_YZ} \\ Z_{PA\_YZ} \end{pmatrix} = \begin{pmatrix} CY_{m\_YZ} & CY_{m-1\_YZ} & \ldots & CY_{1\_YZ} & CY_{0\_YZ} \\ CZ_{m\_YZ} & CZ_{m-1\_YZ} & \ldots & CZ_{1\_YZ} & CZ_{0\_YZ} \end{pmatrix} \begin{pmatrix} Y_{PB}^n \\ Z_{PB}^n \\ \vdots \\ Z_{PB} \\ 1 \end{pmatrix} \quad (8\text{-}3)$$

The corrector 532 synthesizes each of the X, Y and Z components of the probe values $X_{PA\_XY}$ to $Z_{PA\_YZ}$ corrected in the respective planes to calculate a corrected probe value PA ($X_{PA}$, $Y_{PA}$, $Z_{PA}$). Specifically, the corrector 532 calculates the probe value PA according to the following formula (9).

$$\begin{pmatrix} X_{PA} \\ Y_{PA} \\ Z_{PA} \end{pmatrix} = \quad (9)$$

$$\begin{pmatrix} \frac{A_Y}{A_Y+A_Z} & 0 & \frac{A_Z}{A_Y+A_Z} & 0 & 0 & 0 \\ 0 & \frac{A_X}{A_X+A_Z} & 0 & 0 & \frac{A_Z}{A_X+A_Z} & 0 \\ 0 & 0 & 0 & \frac{A_X}{A_X+A_Y} & 0 & \frac{A_Y}{A_X+A_Y} \end{pmatrix}$$

$$\begin{pmatrix} X_{PA\_XY} \\ Y_{PA\_XY} \\ X_{PA\_XZ} \\ Z_{PA\_XZ} \\ Y_{PA\_YZ} \\ Z_{PA\_YZ} \end{pmatrix}$$

As shown in formula (9), the corrector 532 synthesizes X, Y and Z components of the probe values $X_{PA\_XY}$ to $Z_{PA\_YZ}$ corrected in the respective planes after multiplying by $A_X$, $A_Y$ and $A_Z$ for weighting to calculate the corrected probe value PA. Incidentally, $A_X$, $A_Y$ and $A_Z$ represent axial amplitudes of the position command value outputted by the movement command unit 51 in X, Y and Z-axis directions, respectively.

The above synthesizing effectively corrects the displacement of the probe 21 because, for instance, when the contact point 211A circularly moves along a side of the object W in the XY plane at a constant angular velocity to draw a circular locus as in this exemplary embodiment, the influence of the correction parameter $C_{XY}$ in the XY plane is amplified relative to the influence of the other correction parameters $C_{XZ}$ and $C_{YZ}$ in the XZ and YZ planes.

Incidentally, when the contact point 211A circularly moves at a constant angular velocity as in this exemplary embodiment, the position command values show a sine-curve data string. Accordingly, the amplitudes $A_X$, $A_Y$ and $A_Z$ can be calculated according to the process described in, for instance, JP-A-10-009848.

The displacement synthesizing unit 533 synthesizes the scale value S acquired by the displacement acquiring unit 52 and the probe value PA corrected by the corrector 532 to calculate the measurement value. The relationship between the correction parameter calculator 531, the corrector 532 and the displacement synthesizing unit 533 will be described below with reference to the drawing.

Figure 6:
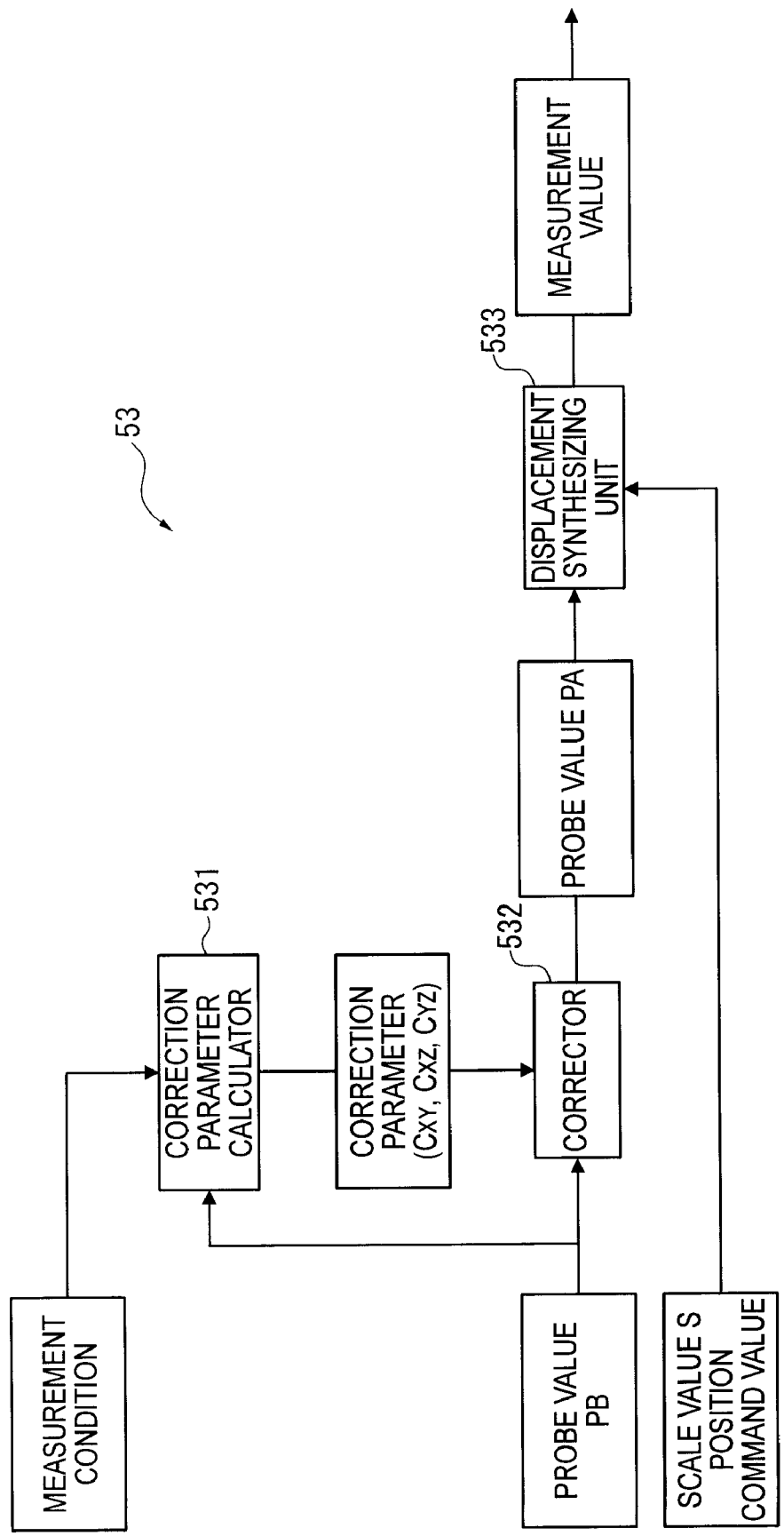
FIG. 6 is a diagram showing an interrelationship between the correction parameter calculator, a corrector and a displacement synthesizing unit in the exemplary embodiment.

FIG. 6 is a diagram showing an interrelationship among the correction parameter calculator 531, the corrector 532 and the displacement synthesizing unit 533.

As shown in FIG. 6, the correction parameter calculator 531 calculates three correction parameters $C_{XY}$, $C_{XZ}$ and $C_{YZ}$ for correcting the probe value PB it the three planes of an orthogonal coordinate system according to the measurement condition in measuring the object W.

The corrector 532 corrects the probe value PB in the respective planes based on the correction parameters $C_{XY}$, $C_{XZ}$ and $C_{YZ}$ calculated by the correction parameter calculator 531 and, subsequently, synthesizes the corrected probe values $X_{PA\_XY}$ to $Z_{PA\_YZ}$ for each of the axial components to calculate the corrected probe value PA.

The displacement synthesizing unit 533 synthesizes the scale value S acquired by the displacement acquiring unit 52 and the probe value PA corrected by the corrector 532 to calculate the measurement value.

Next, the calculation of the coefficient vectors $M_{XY}$, $M_{XZ}$ and $M_{YZ}$ will be described below exemplarily with reference to the coefficient vector $M_{XY}$ (see formula (2-2)) when the measurement direction is clockwise.

The coefficient vectors $MXP_{m\_n\_XY}$ to $MYP_{0\_0\_XY}$ are calculated by measuring the reference sphere 231 in the clockwise measurement direction in advance. Specifically, the host computer 5 measures the reference sphere 231 while varying the push amount $D_P$ to calculate the correction parameters for each of the push amounts $D_P$ according to the formula (8-1). The host computer 5 approximates the calculated correction parameters by polynomial equations of the push amount $D_P$ to calculate the coefficient vectors $MXP_{m\_n\_XY}$ to $MYP_{0\_0\_XY}$.

The host computer 5 calculates the coefficient vector $M_{XY}$ (see formula (2-3)) when the measurement direction is counterclockwise, the coefficient vector $M_{XZ}$ (see formulae (6-2) and (6-3)) and the coefficient vector $M_{YZ}$ (see formulae (7-2) and (7-3)) in the same manner as the coefficient vector $M_{XY}$ when the measurement direction is clockwise.

Then, the host computer 5 stores the calculated coefficient vector $M_{XY}$, $M_{XZ}$ and $M_{YZ}$ in the storage 55.

Alternatively, the coefficient vectors $MXP_{m\_n\_XY}$ to $MYP_{0\_0\_XY}$ may be calculated according to the following formula (10) when the locus drawn by the contact point 211A when the reference sphere 231 is measured in advance in the clockwise measurement direction can be sufficiently approximated by a formula of a circle. Specifically, the host computer 5 measures the reference sphere 231 while varying the push amount $D_P$ and calculates the correction parameters for each of the push amounts $D_P$ according to the formula (10). The host computer 5 approximates the calculated correction parameters by polynomial equations of the push amount $D_P$ to calculate the coefficient vectors $MXP_{m\_n\_XY}$ to $MYP_{0\_0\_XY}$.

Incidentally, the host computer 5 calculates the coefficient vector $M_{XY}$ when the measurement direction is counterclockwise, the coefficient vector $M_{XZ}$ and the coefficient vector $M_{YZ}$ in the same manner as the coefficient vector $M_{XY}$ wen the measurement direction is clockwise.

$$\begin{pmatrix} X_{PA\_XY} \\ Y_{PA\_XY} \end{pmatrix} = \begin{pmatrix} \frac{R_x}{R_0}\cos\phi_x & -\frac{R_x}{R_0}\sin\phi_x \\ \frac{R_y}{R_0}\sin\phi_y & \frac{R_y}{R_0}\cos\phi_y \end{pmatrix}^{-1} \begin{pmatrix} X_{PB} \\ Y_{PB} \end{pmatrix} \quad (10)$$

$$= \frac{1}{\frac{R_x R_y}{R_0^2}\cos\phi_x\cos\phi_y + \frac{R_x R_y}{R_0^2}\sin\phi_x\sin\phi_y}$$

-continued $$\begin{pmatrix} \frac{R_y}{R_0}\cos\phi_y & \frac{R_x}{R_0}\sin\phi_x \\ -\frac{R_y}{R_0}\sin\phi_y & \frac{R_x}{R_0}\cos\phi_x \end{pmatrix} \begin{pmatrix} X_{PB} \\ Y_{PB} \end{pmatrix}$$

The derivation of the formula (10) will be described below.

When the locus drawn by the contact point 211A when the reference sphere 231 is measured in advance in the clockwise measurement direction can be sufficiently approximated by a formula of a circle, the probe values $X_{PB}$, $Y_{PB}$ can be approximated by the following formulae of circles (11-1) and (11-2).

$$X_{PB} = R_x\cos(\theta + \phi_x) \quad (11\text{-}1)$$

$$Y_{PB} = R_y\sin(\theta + \phi_y) \quad (11\text{-}2)$$

Incidentally, $R_X$ represents amplitude of the probe value $X_{PB}$ and $R_Y$ represents amplitude of the probe value $Y_{PB}$. Further, $\Phi_X$ represents a phase of the probe value $X_{PB}$ and $\Phi_Y$ represents a phase of the probe value $Y_{PB}$.

When the true value of the amplitude is represented by $R_0$, the corrected probe values $X_{PA\_XY}$ and $Y_{PA\_XY}$ are represented by the following formulae (12-1) and (12-2).

$$X_{PA\_XY} = R_0\cos\theta \quad (12\text{-}1)$$

$$Y_{PA\_XY} = R_0\sin\theta \quad (12\text{-}2)$$

The following formulae (13-1) and (13-2) can be derived by substituting the formulae (12-1) and (12-2) into the formulae (11-1) and (11-2).

$$\begin{aligned} X_{PB} &= R_x\cos(\theta + \phi_x) \\ &= R_x\cos\theta\cos\phi_x - R_x\sin\theta\sin\phi_x \\ &= \frac{R_x}{R_0}\cos\phi_x \cdot X_{PA\_XY} - \frac{R_x}{R_0}\sin\phi_x \cdot Y_{PA\_XY} \end{aligned} \quad (13\text{-}1)$$

$$\begin{aligned} Y_{PB} &= R_y\sin(\theta + \phi_y) \\ &= R_y\sin\theta\cos\phi_y + R_y\cos\theta\sin\phi_y \\ &= \frac{R_y}{R_0}\sin\phi_y \cdot X_{PA\_XY} + \frac{R_y}{R_0}\cos\phi_y \cdot Y_{PA\_XY} \end{aligned} \quad (13\text{-}2)$$

Matrix expression of the formulae (13-1) and (13-2) results in the following formula (14).

$$\begin{pmatrix} X_{PB} \\ Y_{PB} \end{pmatrix} = \begin{pmatrix} \frac{R_x}{R_0}\cos\phi_x & -\frac{R_x}{R_0}\sin\phi_x \\ \frac{R_y}{R_0}\sin\phi_y & \frac{R_y}{R_0}\cos\phi_y \end{pmatrix} \begin{pmatrix} X_{PA\_XY} \\ Y_{PA\_XY} \end{pmatrix} \quad (14)$$

Further modification of the formula (14) to move the probe value $X_{PA\_XY}$ and $Y_{PA\_XY}$ to the left side results in the above-described formula (10).

Accordingly, when the locus drawn by the contact point 211A in measuring the reference sphere 231 in advance can be sufficiently approximated by a formula of a circle, the correction parameters $C_{XY}$, $C_{XZ}$ and $C_{YZ}$ may be coefficients when the corrected probe values $X_{PA\_XY}$ to $Z_{PA\_YZ}$ are approximated by the formula of the circle of the probe value PB. Further, one or two of the correction parameters $C_{XY}$, $C_{XZ}$ and $C_{YZ}$ may be the coefficients of a polynomial equation of the probe value PB when the corrected probe values are approximated by the polynomial equation and the rest of the correction parameters may be the coefficients of the formula of the circle of the probe value PB when the corrected probe value is approximated by the formula of the circle.

Figure 7A:
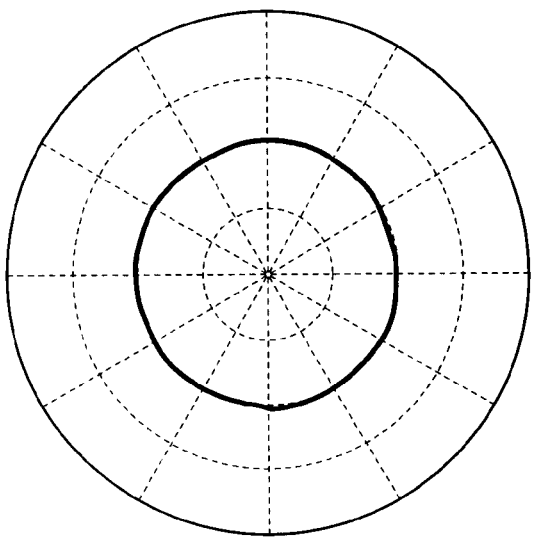
FIG. 7A is an illustration showing a measurement result of a side geometry of an object when a push amount during a profiling measurement is small in measuring a surface profile of the object while correcting a probe value by the corrector in the exemplary embodiment.
Figure 7B:
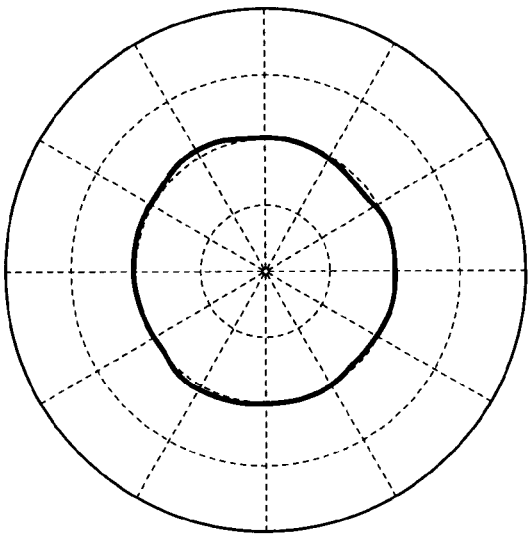
FIG. 7B is an illustration showing a measurement result of the side geometry of the object when the push amount during the profiling measurement is large in measuring the surface profile of the object while correcting the probe value by the corrector in the exemplary embodiment.
Figure 7C:
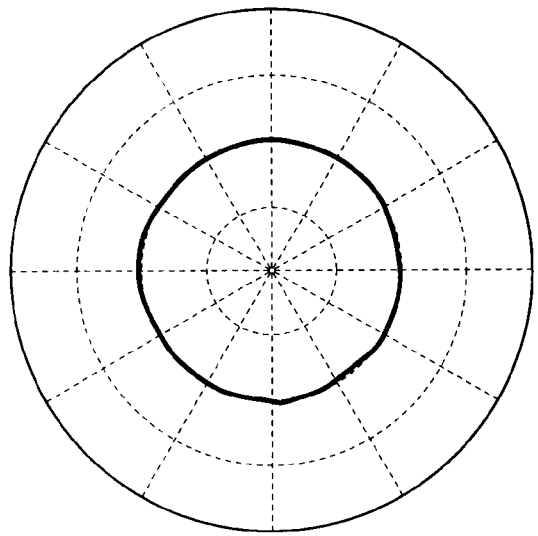
FIG. 7C is an illustration showing a measurement result of the side geometry of the object when a measurement direction during the profiling measurement is counterclockwise in measuring the surface profile of the object while correcting the probe value by the corrector in the exemplary embodiment.
Figure 7D:
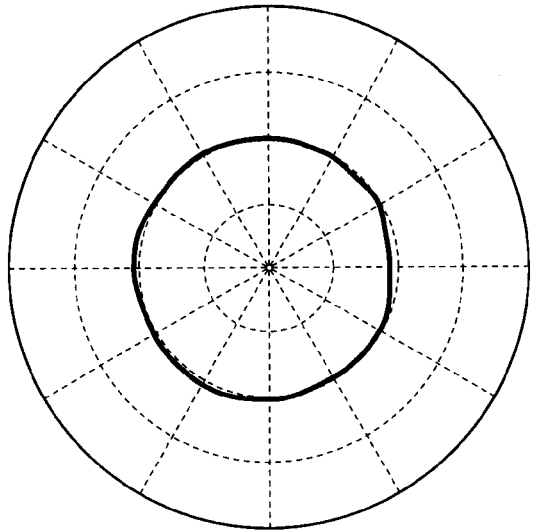
FIG. 7D is an illustration showing a measurement result of the side geometry of the object when the measurement direction during the profiling measurement is clockwise in measuring the surface profile of the object while correcting the probe value by the corrector in the exemplary embodiment.

FIGS. 7A to 7D are illustrations showing the measurement results of a surface profile (side geometry) of the object W after correcting the probe value PB by the corrector 532 while varying the measurement condition. In FIGS. 7A to 7D, the push amount $D_P$ is represented by relative two stages (i.e. small and large). FIG. 7A shows the measurement result when the push amount $D_P$ during the profiling measurement is small and FIG. 7B shows the measurement result when the push amount $D_P$ during the profiling measurement is large. FIG. 7C shows the measurement result when the measurement direction during the profiling measurement is counter-clockwise and FIG. 7D shows the measurement result when the measurement direction is clockwise.

As shown in FIGS. 7A to 7D, the measurement results show substantially the same shape in every case. In other words, it has been found that the coordinate measuring machine 1 can properly correct the probe value PB irrespective of the change in the measurement condition and can reduce the measurement error.

According to this exemplary embodiment, the following advantages can be obtained.

(1) The coordinate measuring machine 1 has the correction parameter calculator 531 for calculating the correction parameters $C_{XY}$, $C_{XZ}$ and $C_{YZ}$ for correcting the probe value PB. The correction parameter calculator 531 calculates the correction parameters $C_{XY}$, $C_{XZ}$ and $C_{YZ}$ based on the push amount $D_P$ and measurement direction in measuring the object W, so that the corrector 532 can correct the probe value PB by the correction parameters $C_{XY}$, $C_{XZ}$ and $C_{YZ}$ in accordance with the push amount $D_P$ and the measurement direction. Accordingly, the coordinate measuring machine 1 can properly correct the probe value PB irrespective of the change in the push amount $D_P$ and the measurement direction, so that the measurement error can be reduced.

(2) The correction parameter calculator 531 is adapted to automatically detect the measurement direction based on the position command value for moving the probe 21 by the movement mechanism 22. Accordingly, even when, for instance, the probe 21 is freely moved by the movement mechanism 22, the measurement direction can be easily detected.

(3) Since the correction parameter calculator 531 calculates the respective correction parameters $C_{XY}$, $C_{XZ}$ and $C_{YZ}$ for correcting the probe value PB in the respective planes, the effect of the correction by the calculated correction parameters $C_{XY}$, $C_{XZ}$ and $C_{YZ}$ can be easily recognized in the planes. Further, since the corrector 532 corrects the probe value PB by synthesizing the corrected probe values $X_{PA\_XY}$ to $Z_{PA\_YZ}$ for each axial component, the error in the correction parameters $C_{XY}$, $C_{XZ}$ and $C_{YZ}$ can be reduced by an averaging effect.

(4) When the correction parameters $C_{XY}$, $C_{XZ}$ and $C_{YZ}$ are coefficients of a polynomial equation of the probe value PB that approximates the corrected probe values $X_{PA\_XY}$ to $Z_{PA\_YZ}$, the order of the polynomial equation can be changed for each of the planes depending on the influence of the correction, the time required for the correction processing can be reduced.

(5) When the correction parameters $C_{XY}$, $C_{XZ}$ and $C_{YZ}$ are coefficients of a formula of a circle of the probe value PB that approximates the corrected probe values $X_{PA\_XY}$ to $Z_{PA\_YZ}$, the number of the correction parameters can be reduced, thereby reducing the time required for the correction processing.

(6) When one or two of the correction parameters $C_{XY}$, $C_{XZ}$ and $C_{YZ}$ are coefficients of the polynomial equation of the probe value PB that approximates the corrected probe value and the rest of the correction parameters are coefficients of a formula of a circle of the probe value PB that approximates the corrected probe value, polynomial equations of different orders and the formula of the circle can be selectably used for each of the planes depending on the influence of the correction and the locus drawn by the contact point 211A when the reference sphere 231 is measured. Accordingly, the time required for correction processing can be reduced while properly correcting the probe value PB.

Incidentally, the scope of the present invention is not limited to the above exemplary embodiment, but includes modification, improvements and the like as long as they are compatible with the invention.

For instance, in the above exemplary embodiment, the correction parameter calculator 531 calculates the push amount $D_P$ based on the probe value PB (see formula (3)) and detects the measurement direction based on the position command signal outputted by the movement command unit 51 (see formulae (4) and (5)). The correction parameter calculator 531 calculates the correction parameters $C_{XY}$, $C_{XZ}$ and $C_{YZ}$ according to the calculated push amount $D_P$ and the detected measurement direction in accordance with the formulae (3) to (5).

However, the correction parameter calculator 531 may calculate the correction parameter based on, for instance, the push amount and the measurement direction inputted via the input unit 61.

In the above exemplary embodiment, the correction parameter calculator 531 calculates the correction parameters $C_{XY}$, $C_{XZ}$ and $C_{YZ}$ based on the push amount $D_P$ and the measurement direction. Alternatively, however, the correction parameter calculator may calculate the correction parameters based on the other measurement conditions such as measurement speed. In other words, the correction parameter calculator may be configured in any manner as long as the correction parameter calculator calculates the correction parameter based on the measurement condition in measuring the object.

In the above exemplary embodiment, the correction parameter calculator 531 calculates three correction parameters $C_{XY}$, $C_{XZ}$ and $C_{YZ}$ respectively for correcting the probe value PB in three planes of an orthogonal coordinate system. The corrector 532 corrects the probe value PB in the respective planes based on the correction parameters $C_{XY}$, $C_{XZ}$ and $C_{YZ}$ and, subsequently, calculates the corrected probe value PA by synthesizing the corrected probe values $X_{PA\_XY}$ to $Z_{PA\_YZ}$ in the respective planes for each of the X, Y and Z components.

However, the correction parameter calculator may alternatively calculates the correction parameter for correcting the displacement of the probe in three-dimensional space and the corrector may alternatively correct the probe value within the three-dimensional space.

In the above exemplary embodiment, the movement mechanism 22 has three movement axes for moving the probe 21 in X, Y and Z-axis directions orthogonal with each other. However, the movement mechanism may alternatively have one or two movement axes and the respective movement axes may not be orthogonal with each other. In other words, the movement mechanism may be configured in any manner as long as a profiling movement can be made by the probe.

What is claimed is:

1. A coordinate measuring machine, comprising:
    a probe having a stylus comprising at an end thereof a contact point to be in contact with an object to be measured, a support mechanism that supports a base end of the stylus so that the stylus is movable within a predetermined range, and a probe sensor that detects a displacement of the stylus;
    a movement mechanism that holds and moves the probe; and
    a controller that controls the movement mechanism, the coordinate measuring machine measuring the object by moving the contact point along a surface of the object to be measured while forcing the probe against the object, the controller comprising:
    a displacement acquiring unit that acquires a displacement of the movement mechanism and the displacement of the stylus;
    a correction parameter calculator that calculates a correction parameter for correcting the displacement of the stylus acquired by the displacement acquiring unit;
    a corrector that corrects the displacement of the stylus acquired by the displacement acquiring unit based on the correction parameter; and
    a displacement synthesizing unit that synthesizes the displacement of the movement mechanism and the displacement of the stylus corrected by the corrector to calculate the position of the contact point,
    wherein the correction parameter calculator calculates the correction parameter based on a measurement condition in measuring the object.

2. The coordinate measuring machine according to claim 1, wherein
    the correction parameter calculator calculates the correction parameter based on a push amount of the probe and a measurement direction.

3. The coordinate measuring machine according to claim 2, wherein
    the correction parameter calculator detects the measurement direction based on a position command value for moving the probe by the movement mechanism.

4. The coordinate measuring machine according to claim 1, wherein
    the correction parameter calculated by the correction parameter calculator includes three correction parameters for correcting the displacement of the stylus in three planes of an orthogonal coordinate system, and
    the corrector corrects the displacement of the stylus in the three planes respectively by the three correction parameters and, subsequently, synthesizes respective axial components of the corrected displacements to correct the displacement of the stylus.

5. The coordinate measuring machine according to claim 4, wherein
    the correction parameters are coefficients of a polynomial equation of the displacement of the stylus that approximates the corrected displacement of the stylus.

6. The coordinate measuring machine according to claim 4, wherein
    the correction parameters are coefficients of a formula of a circle of the displacement of the stylus that approximates the corrected displacement of the stylus.

7. The coordinate measuring machine according to claim 4, wherein
    one or two of the correction parameters are coefficients of a polynomial equation of the displacement of the stylus that approximates the corrected displacement of the stylus and the rest of the correction parameters are coefficients of a formula of a circle of the displacement of the stylus that approximates the corrected displacement of the stylus.

* * * * *